United States Patent
Johnson

[15] 3,666,001
[45] May 30, 1972

[54] HIGH TEMPERATURE SEAL

[72] Inventor: John N. Johnson, Utica, Mich.

[73] Assignee: General Motors Corporation, Detroit, Mich.

[22] Filed: Aug. 10, 1970

[21] Appl. No.: 62,257

[52] U.S. Cl............................................277/234, 277/234
[51] Int. Cl......................................................F28d 19/00
[58] Field of Search...................277/234, 81, 96; 117/169 A; 106/84, 302; 165/9

[56] References Cited

UNITED STATES PATENTS

| | | | |
|---|---|---|---|
| 3,053,694 | 9/1962 | Daunt et al. | 277/81 |
| 3,102,038 | 8/1963 | Fisher | 106/302 |
| 3,130,061 | 4/1964 | McMahon et al. | 106/84 M |

Primary Examiner—Robert I. Smith
Attorney—Sidney Carter and Peter P. Kozak

[57] ABSTRACT

A rubbing contact fluid seal, particularly suitable for use in a gas turbine engine rotary regenerator, comprising a reticulate metal facing layer bonded to a base member and adapted for rubbing contact with the regenerator, the facing layer having disposed in the pores thereof a seal material consisting of, by weight, 72 to 75 percent chromite powder and potassium silicate equivalent to 25 to 28 percent of an aqueous potassium silicate solution containing about 29.1 percent, by weight, potassium silicate which material is bonded in and to the facing layer by curing at 500° F.

4 Claims, 5 Drawing Figures

Patented May 30, 1972

INVENTOR.
John N. Johnson
BY
Peter P. Kozak
ATTORNEY

Patented May 30, 1972
3,666,001
2 Sheets-Sheet 2
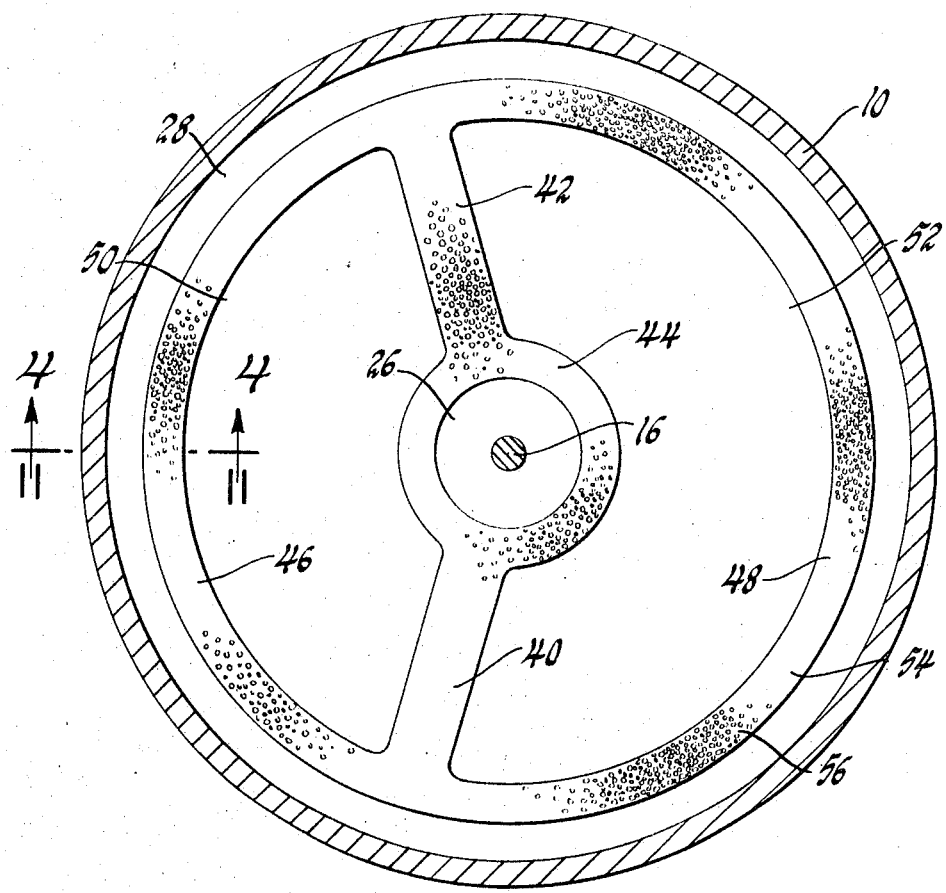
Fig. 3
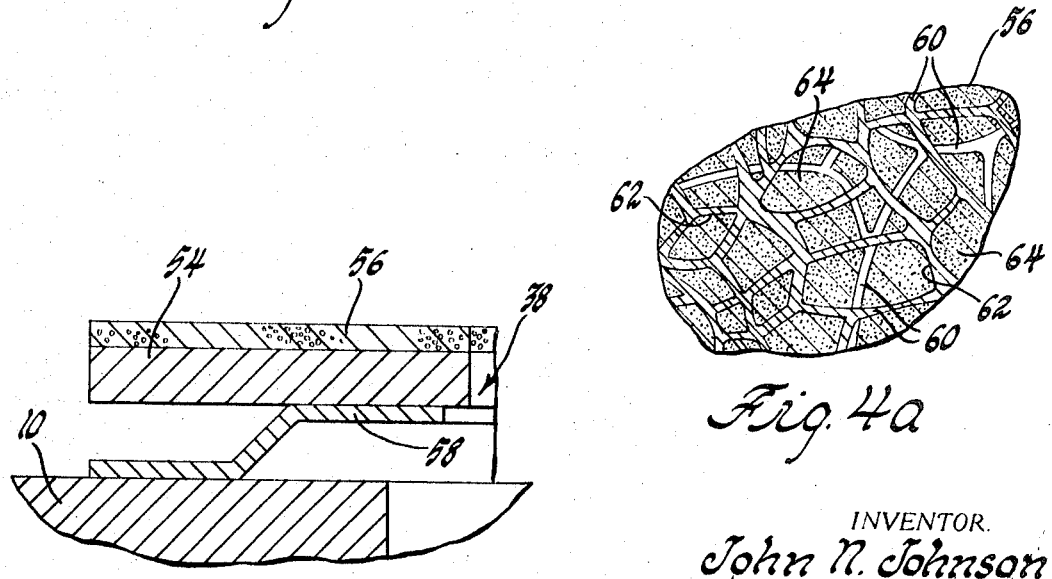
Fig. 4
Fig. 4a
INVENTOR.
John N. Johnson
BY
Peter P. Kozak
ATTORNEY

HIGH TEMPERATURE SEAL

This invention relates to an improved rubbing contact fluid seal suitable for use in a rotary regenerator for gas turbine engine applications and, more particularly, to an improved fluid seal material for such applications having a relatively low coefficient of friction, low wear rate, good chemical stability at elevated temperatures in an oxidizing environment and excellent resistance to sulfur-containing compounds in the gas turbine engine exhaust gases.

Currently, there is a family of gas turbine engines which use rotating disc-type regenerators to recover usable heat from exhaust gases to preheat incoming combustion air. A necessary requirement of the regenerator system is an effective seal across the faces of the rotating disc to prevent leakage of the high pressure incoming air into the counterflowing exhaust gas. A rubbing seal is desired as it has the potential for lowest leakage. These rubbing seals are required to operate at a maximum temperature of about 600° F. on the outboard or cold side of the seal and at temperatures up to 1,200° F. on the inboard or hot side of the seal. The desired properties of the rubbing seal material are that it have good oxidation resistance and thermal stability, good wear resistance, a relatively low coefficient of friction over a wide range of temperatures, and that it exhibit overall compatibility with the regenerator matrix material. In addition, since metallic regenerators assume a slight spheroidal inward bulge during operation, the seal must be flexible enough to conform to the shape of the regenerator.

In my copending application, Ser. No. 38,206 filed May 18, 1970 and assigned to the assignee of this invention, I described a particularly suitable rotary regenerator rubbing contact fluid seal having the aforementioned desired properties comprising a reticulate metal facing layer bonded to a base member and adapted for rubbing contact with the regenerator, the facing layer having disposed in the pores thereof a seal material consisting of, by weight, 53 to 67% $NiFe_2O_4$ powder, 3 to 18% ZnO and 28 to 32% aqueous sodium silicate solution which material is bonded in and to the facing layer by curing at 500° F. It has been found, however, that my improved seal material exhibits not only a relatively low coefficient of friction, low wear rate and good thermal stability at elevated temperatures in an oxidizing environment but also increased resistance to attack by sulfur-containing compounds, particularly $SO_2$ and $SO_3$, in the gas turbine engine exhaust gases which results in longer seal life particularly at portions of the hot side of the seal which are continually exposed to engine exhaust gases.

Accordingly, it is an object of my invention to provide an improved rubbing contact fluid seal for use in the regenerator portion of a gas turbine engine which has relatively low friction and wear properties, which is resistant to the deleterious effects of high temperatures typical of those found in gas turbine engines, and which is resistant to attack by sulfur-containing compounds in the gas turbine engine exhaust gases.

In the preferred embodiment of my invention this object and others are accomplished by providing a seal having a metallic base and a reticulate nickel facing layer adapted for rubbing contact with a rotating regenerator matrix and characterized by fibrils forming a substantially uniform, three-dimensional skeletal network with interconnected pores therebetween bonded to the base with the seal being held against the regenerator matrix such that the facing layer is continuously in rubbing contact with the opposed radial faces of the matrix. In accordance with the principal feature of my invention the pores of the facing layer are filled with a seal material consisting essentially of, by weight, about 72 to 75 percent chromite powder and potassium silicate equivalent to 25 to 28 percent of an aqueous potassium silicate solution containing about 29.1 percent, by weight, potassium silicate which material is bonded to the fibrils of the facing layer by a low temperature oven cure wherein the potassium silicate binder forms a bond between the chromite powder and the facing fibrils.

As used herein, the term "chromite" refers to the naturally occurring minerals which are oxides of iron and chromium containing a major portion of chromic oxides. The minerals are chromium-bearing spinel types whose compositions can be expressed as $(Mg, Fe^{-2})O \cdot (Cr, Al, Fe^{-3})_2O_3$.

Other objects and advantages of my invention will become more apparent from the following detailed description of the invention reference being had to the accompanying drawings, of which:

FIG. 3 is a sectional view of the same taken in a plane indicated by the line 3—3 in FIG. 1;

FIG. 4 is an enlarged view of a portion of the seal shown in FIG. 1; and

FIG. 4a is an enlarged view of a portion of FIG. 4.

Figure 1:
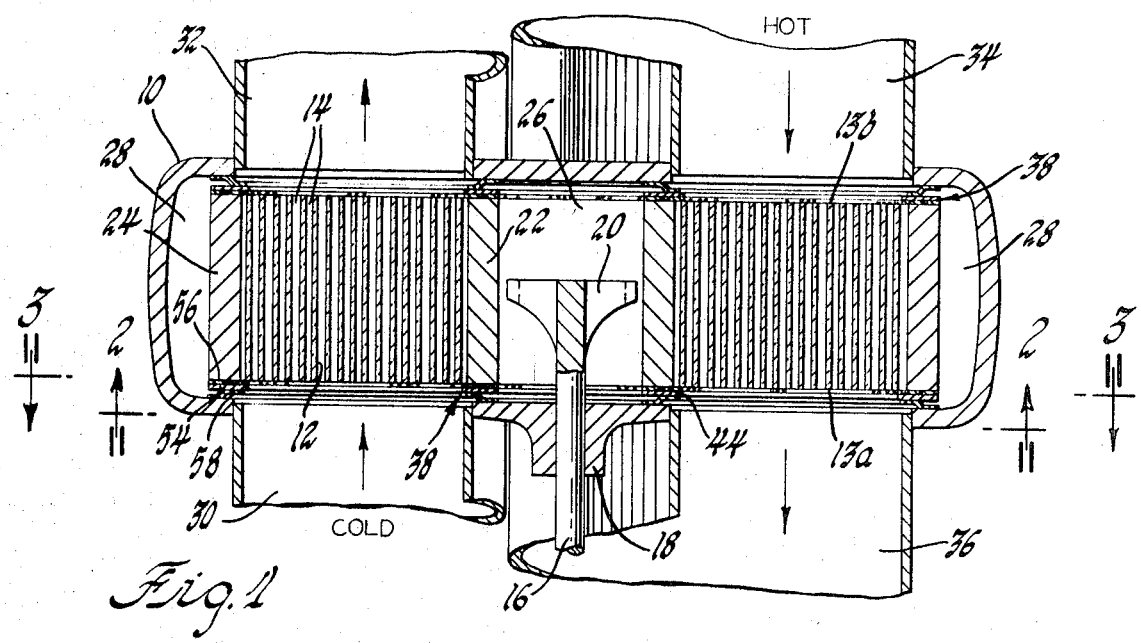
FIG. 1 is a schematic sectional view of a rotary regenerator taken on the plane indicated by line 1—1 in FIG. 2.
Figure 2:
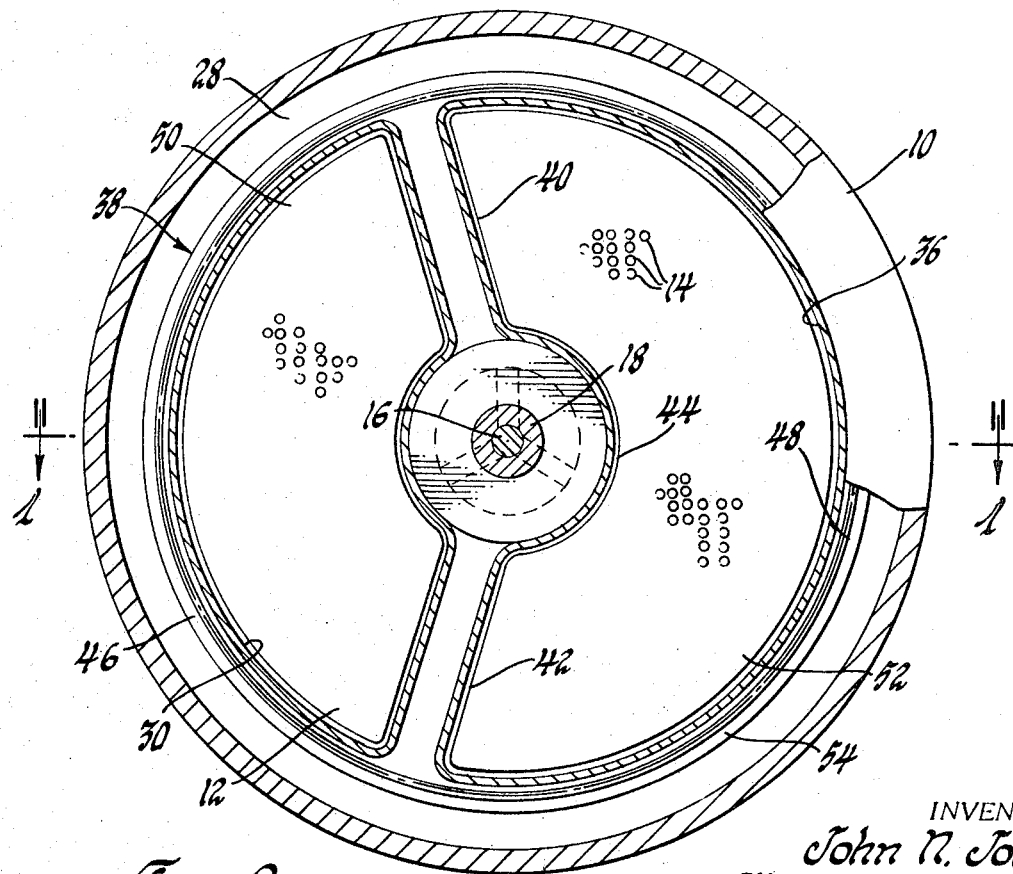
FIG. 2 is a sectional view of the same taken in a plane indicated by the line 2—2 in FIG. 1.

FIGS. 1 to 3 generally show schematically a disc-type rotary regenerator portion of a gas turbine engine (not shown). Referring first to FIG. 1, the regenerator comprises a housing 10 which is generally drum-shaped and which encloses an annular matrix 12 which is of a structure defining pores or passages 14 (greatly enlarged in FIG. 1) extending between the opposed radial faces 13a and 13b of the matrix generally parallel to the axis of rotation defined by a driving shaft 16. The matrix 12 is fabricated from alternate spiral layers of flat and corrugated stainless steel sheet stock or a ceramic. Shaft 16 is mounted in suitable bearings in a boss 18 on the housing and terminates in a spider 20 which is coupled by means (not shown) to the matrix so that the matrix may be rotated slowly. The matrix preferably includes a non-porous inner rim 22 and a non-porous outer rim 24. A generally cylindrical space 26 is defined within the interior of the matrix and a space 28 extends around the periphery of the matrix within the housing 10. An inlet 30 for cold, high pressure air enters one face of the housing and opposite to it an outlet 32 is provided for the heated compressed air. The hot, low pressure exhaust gases enter through an inlet 34 and leave the regenerator through an outlet 36, the two streams thus being in counterflow relation.

A seal 38 is provided between each radial face of the matrix and the housing in rubbing contact with the rotating matrix to confine the cold and hot gases to the desired paths through the matrix from inlet to outlet and thereby minimize leakage between the paths. As shown more clearly in FIGS. 2 and 3, such a seal comprises two arms 40 and 42 extending radially of the matrix base preferably joined at the inner rim of the matrix by a circular seal portion 44 extending around the interior cavity 26 and joined at the outer rim of the matrix by an arcuate rim or by-pass seal 46 extending around the high pressure path and an arcuate rim seal 48 extending around the low pressure path. The seal assembly thus defines an opening 50 for the cold, high pressure air and an opening 52 for the hot, low pressure exhaust gas. These openings, as shown in FIG. 2, conform generally in the outline of the ducts 30 and 32, and 34 and 36, respectively.

The seal 38 in rubbing contact with the matrix 12 comprising portions defining the arms 40 and 42, the inner seal portion 44 and the outer seal portion comprised of arcs 46 and 48, as indicated in FIGS. 2 and 3, is comprised of a stationary base member 54 which is a flat sheet of metal, for example, a stainless steel sufficiently thick to be reasonably stiff and rigid, but sufficiently flexible to curve slightly in accordance with any distortion of the matrix, and a facing layer 56 which covers the forward or matrix face of the base 54, as shown in FIG. 3. During engine operation, the seal is held against the regenerator by a gas pressure differential between the high pressure incoming air and the low pressure exhaust such that the facing layer 56 is continuously in rubbing contact with the rotating matrix 12. The pressure differential also acts to hold flexible metal leaf seals 58 (FIG. 4) which are welded to the base 54 against the adjacent housing 10.

Referring now to FIG. 4a, the facing layer 56 is a porous structure characterized by fibrils 60 which form a three-dimensional skeletal network with pores 62 therebetween. In accordance with the principal feature of my invention the pores 62 of the facing 56 are filled with a seal material 64 which consists of chromite powder with a potassium silicate binder. This material performs with a moderate friction coefficient, low wear rate and exhibits good chemical stability at high temperatures in an oxidizing environment which are necessary requirements for a seal material for use in a gas turbine engine rotary regenerator. In addition, this material exhibits excellent resistance to attack by sulfur-containing exhaust gases. The seal material 64 fills the pores 62 of the facing layer 56 and is bonded to the fibrils 60 such that the facing retains and reinforces the chromite seal material and allows the seal to flex as the regenerator distorts in operation.

The porous facing may be any of the well-known cellular, reticular or sintered type structures having a porosity and pore configuration such that the chromite seal material forms a major part of the rubbing contact surface while the facing acts only as a support structure forming a minor part of the rubbing contact surface. In this manner the friction characteristics of the seal will be mainly those of the chromite material with the friction characteristics of the facing having only a minimal effect. It is also desirable that the facing be of a material having thermal expansion properties similar to the chromite material, the base 54 and the matrix 12 to minimize distortion or warpage due to differing coefficients of thermal expansion between materials. Nickel or nickel alloys containing predominately nickel have been found to be suitable materials for the facing. I have found that a reticulate-type structure (shown schematically in FIG. 4a) which is a three-dimensional skeletal structure of interconnected fibrils with no membranes or windows partitioning the contiguous pores, such as that described in an article appearing in the Apr. 1968 issue of Materials Engineering at page 44, to be a preferred facing structure because the reticulate structure allows the seal material to flow between the interconnected pores and form a continuous seal phase. The structure described in the article is a metal foam produced by electroplating a layer of nickel on a reticulated urethane substrate to produce a continuous metal network of interconnected pores with a pore density of 10 to 100 pores per inch. The Ball U.S. Pat. No. 3,111,396 discloses an alternative method of forming the metal foam by depositing a slurry of a liquid and finely divided metal powder on an open-pore type organic structure such as polyurethane and then sintering the coated structure to produce a continuous skeletal metal structure. I have found that a reticulate nickel foam having a density of about 45 pores/inch serves as an excellent facing material.

The rubbing seal 38 for use in a rotary regenerator is formed by first disposing the porous facing layer about one-eighth inch thick on the base 54 (FIGS. 3 and 4) and bonding the facing thereto such that the facing conforms to and covers arms 40 and 42 and rims 44, 46 and 48. In my preferred seal construction, the base 54 is formed of type 430 stainless steel and is about 0.060 inch thick. The members are bonded together by conventional powder furnace brazing. A suitable braze material is Nicrobraz 30 a product of Wall Colmonoy Corporation, which has a typical composition of 71 percent nickel, 19 percent chromium and 10 percent silicon.

The facing is filled by first preparing a slurry composition consisting of from about 72 to 75 wt% of chromite powder and from about 25 to 28 wt% aqueous potassium silicate solution. A suitable type of aqueous potassium silicate solution is Kasil No. 1, a product of the Philadelphia Quartz Company which, as shown below, contains about 29.1 percent, by weight, potassium silicate and which has the following properties as listed by the manufacturer:

| | |
|---|---|
| Weight ratio $SiO_2/K_2O$ | 2.50 |
| Weight % $SiO_2$ | 20.8 |
| Weight % $K_2O$ | 8.30 |
| Density, °Be | 29.8 |
| Density, lbs/gal | 10.5 |
| Viscosity, centipoises | 40 |

The slurry composition is placed in a vertically positioned tube having an opening surrounded by an annular disc placed tightly against the facing. Pulses of air are applied to the slurry by means of a solenoid valve arrangement whereby the slurry flows out the opening and into the support. The base seals the bottom side of the facing while the annular disc seals the top thereby causing the slurry to flow concentrically outward filling the pores of the facing.

After filling, the seal is subjected to an oven curing treatment to remove the water from the slurry and to bond the chromite powder to the facing fibrils, as previously mentioned. The curing treatment used is as follows:

Heat to 150° F., hold for 2 hours
Heat to 175° F., hold for 1 hour
Heat to 200° F., hold for 1 hour
Heat to 225° F., hold for 1 hour
Heat to 250° F., hold for 1 hour
Heat to 500° F., hold for 1 hour
All heating rates above 150° are at 50° F. per hour The curing treatment is performed in a step-like manner in order to avoid bubbling of the potassium silicate.

For the purpose of demonstrating the utility of my invention, 1-inch diameter test buttons were made and held in a stationary fixture against a rotating regenerator-like disc having a construction similar to that of a full size regenerator. The following test parameters were used:

| | |
|---|---|
| Disc material | type 430 stainless steel |
| Disc braze material | copper |
| Seal temperature | 800°–1200° F. |
| Load | 5 psi |
| Air pressure | 1.5 psig |
| Disc Sliding Speed | 56.6 feet/minute |
| Test time | 5.5 hours |

The results of the test are as follows:

| | |
|---|---|
| Disc wear | 0.1 mils |
| Seal wear | 0.3 mils |
| Sliding Friction Coefficient | 0.2–0.25 |
| Percent contact | 80% |
| Disc damage | none |

Control samples which were placed in an oxidizing environment at 1,200° F. for the 5.5 hours showed an average amount of oxidation of 0.5 mils.

For the purpose of demonstrating the life of my seal material, long range testing was performed at 1,200° F. using the same parameters as in the aforementioned test but at a sliding speed of 84.4 feet/min. for 1,000 hours. Examination of the seal and disc after testing showed negligible seal wear, an average disc wear of 0.6 mils and a seal contact area of over 90 percent. No damage was noted to the disc. Control samples which were placed in an oxidizing environment at 1,200° F. for the 1,000 hours showed an average amount of oxidation of 0.3 mils.

In addition to the wear and life tests previously described, corrosion tests were performed to determine the resistance of my seal material to attack by sulfur-containing compounds typically found in gas turbine engine exhaust gases. In these tests the seal test buttons were exposed to an air – 1 percent $SO_2$ atmosphere for 100 hours at 1,200° F. and showed no deterioration as a result thereof. Similarly, in engine durability tests no seal deterioration was seen after 300 – 400 hours of service.

From the foregoing, it will be noted that my seal material is a relatively low-friction, low-wear material which is resistant to oxidation and deterioration at elevated temperatures and which is resistant to attack by sulfur-containing compounds in gas turbine engine exhaust gases. Although my invention has been described in terms of preferred embodiments with reference to a particular rotary regenerator structure, it will be appreciated that other forms may be adopted within the scope of my invention. For example, in many regenerator operations the outboard or cold side of the seal and the rim of the hot side seal operate at less than 800° F. In this case my seal material may be replaced in these regions with graphite, which has a coefficient of friction of about 0.05 but which oxidizes above 800° F., with my seal material being used only on seal regions which operate at temperatures up to 1,200° F.

Thus having described my invention what is claimed is:

1. A rubbing contact fluid sealing member comprising a base member and a porous layer formed of a metal having temperature resistance and oxidation and sulfidation resistance at temperatures in excess of 1,200° F. adapted for rubbing contact bonded to at least a portion of said base member with a seal material filling the pores of said layer and bonded therein, said layer having a pore density in the range of about 10 to 100 pores/inch, said seal material being formed and bonded to said layer by heating a composition consisting essentially of, by weight, about 72 to 75 percent chromite powder and potassium silicate equivalent to 25 to 28 percent of an aqueous potassium silicate solution containing about 29.1 percent, by weight, potassium silicate for a time and at a temperature of at least about 500° F. to substantially completely cure said potassium silicate solution in said pores.

2. A fluid sealing member as defined in claim 1 wherein said layer is reticulate nickel foam having a pore density of about 30 to 60 pores/inch.

3. A fluid seal for use in the rotary regenerator portion of a gas turbine engine, said portion including a housing adapted to enclose a rotating regenerator matrix, said seal comprising, in combination, a stationary metal base and a reticulate layer formed of a metal having temperature resistance and oxidation and sulfidation resistance at temperatures in excess of 1,200° F. characterized by fibrils forming a three-dimensional skeletal network with interconnected pores therebetween bonded to at least a portion of said base, and means for retaining said base member between said housing and said matrix with said layer being adapted for rubbing contact with said rotating regenerator matrix, said layer having a pore density in the range of about 10 to 100 pores/inch, the pores of said layer being filled with a seal material bonded therein, said seal material being formed and bonded in said layer by heating a composition consisting essentially of, by weight, 72 to 75 percent chromite powder and potassium silicate equivalent to 25 to 28 percent of an aqueous potassium silicate solution containing about 29.1 percent, by weight, potassium silicate for a time and at a temperature of at least about 500° F. to substantially completely cure said potassium silicate solution in said pores.

4. A fluid seal as defined in claim 3 wherein said layer has a pore density of about 45 pores/inch.

* * * * *

PO-1050
(5/69)

UNITED STATES PATENT OFFICE
CERTIFICATE OF CORRECTION

Patent No. 3,666,001        Dated May 30, 1972

Inventor(s) John N. Johnson

It is certified that error appears in the above-identified patent and that said Letters Patent are hereby corrected as shown below:

Column 2, line 3, "$(Mg,Fe^{-2})O \cdot (Cr,Al,Fe^{-3})_2O_3$"

should read -- $(Mg,Fe^{+2})O \cdot (Cr,Al,Fe^{+3})_2O_3$ --

Signed and sealed this 10th day of October 1972.

(SEAL)
Attest:

EDWARD M. FLETCHER, JR.        ROBERT GOTTSCHALK
Attesting Officer               Commissioner of Patents